(12) United States Patent
Murakami et al.

(10) Patent No.: US 12,534,500 B2
(45) Date of Patent: Jan. 27, 2026

(54) MODIFIED TRICHODERMA FUNGAL STRAIN FOR THE PRODUCTION OF AN ENZYME COCKTAIL

(71) Applicant: CENTRO NACIONAL DE PESQUISA EM ENERGIA E MATERIAIS, Campinas (BR)

(72) Inventors: Mario Tyago Murakami, Paulinia (BR); Lucas Miranda Fonseca, Sumare (BR); Lucas Salera Parreiras, Holambra (BR)

(73) Assignee: CENTRO NACIONAL DE PESQUISA EM ENERGIA E MATERIAIS, Campinas (BR)

( * ) Notice: Subject to any disclaimer, the term of this patent is extended or adjusted under 35 U.S.C. 154(b) by 493 days.

(21) Appl. No.: 17/626,877

(22) PCT Filed: Jul. 16, 2019

(86) PCT No.: PCT/BR2019/050275
§ 371 (c)(1),
(2) Date: Jan. 13, 2022

(87) PCT Pub. No.: WO2021/007630
PCT Pub. Date: Jan. 21, 2021

(65) Prior Publication Data
US 2022/0259270 A1  Aug. 18, 2022

(51) Int. Cl.
| | | |
|---|---|---|
| C07K 14/37 | (2006.01) |
| C12N 9/02 | (2006.01) |
| C12N 9/42 | (2006.01) |
| C12N 9/48 | (2006.01) |
| C12N 9/58 | (2006.01) |
| C12N 15/52 | (2006.01) |

(52) U.S. Cl.
CPC ............ C07K 14/37 (2013.01); C12N 9/0008 (2013.01); C12N 9/2445 (2013.01); C12N 9/485 (2013.01); C12N 9/58 (2013.01); C12N 15/52 (2013.01); C12Y 102/04002 (2013.01); C12Y 302/01021 (2013.01); C12Y 304/15001 (2013.01); C12Y 304/23018 (2013.01)

(58) Field of Classification Search
CPC .... C07K 14/37; C12N 9/0008; C12N 9/2445; C12N 9/485; C12N 9/58; C12N 15/52; C12Y 102/04002; C12Y 302/01021; C12Y 304/15001; C12Y 304/23018
See application file for complete search history.

(56) References Cited

U.S. PATENT DOCUMENTS

| | | |
|---|---|---|
| 2010/0129880 A1 | 5/2010 | Gudynaite-Savitch |
| 2018/0215797 A1 | 8/2018 | Landowski |

FOREIGN PATENT DOCUMENTS

| | | |
|---|---|---|
| CA | 2994320 | 6/2007 |
| CN | 102292438 | 12/2011 |
| CN | 109790510 | 5/2019 |
| WO | 2011075677 | 6/2011 |
| WO | 2013102674 | 7/2013 |
| WO | 2017177289 | 10/2017 |
| WO | WO-2017177289 A1 * | 10/2017 |
| WO | 2018093752 | 5/2018 |

OTHER PUBLICATIONS

Landowski et al. "Enabling Low Cost Biopharmaceuticals: A Systematic Approach to Delete Proteases from a Well-Known Protein Production Host Trichoderma reesei", PLoS One, 2015, vol. 10, Issue 8, article e0134723; 28 pages. (Year: 2015).*
Murray et al. "Expression in Trichoderma reesei and characterization of a thermostable family 3 β-glucosidase from the moderately thermophilic fungus Talaromyces emersonii", Protein Expression and Purification, 2004, vol. 38, Issue 2, pp. 248-257. (Year: 2004).*
Dwyer et al. "Recombinant production and characterisation of two chitinases from Rasamsonia emersonii, and assessment of their potential industrial applicability", Applied Microbiology and Biotechnology, 2021, vol. 105, pp. 7769-7783. (Year: 2021).*
GenBank 01 reference corresponding to accession No. XP006966092, identified in GenBank on Feb. 5, 2020 (Year: 2020).*
GenBank 02 reference corresponding to accession No. Q9P8W3.1, deposited in GenBank on May 29, 2024 (Year: 2024).*
GenBank 03 reference corresponding to accession No. XP006968395, deposited in GenBank on Feb. 5, 2020 (Year: 2020).*
GenBank 04 reference corresponding to accession No. AAL69548, deposited in GenBank on Jul. 10, 2003 (Year: 2003).*
GenBank 05 reference corresponding to accession No. XP006961768, deposited in GenBank on Feb. 5, 2020 (Year: 2020).*
GenBank 06 corresponding to accession No. ABB59678, deposited in GenBank on Oct. 2, 2006 (Year: 2006).*
Ellilä et al. "Development of a low-cost cellulase production process using Trichoderma reesei for Brazilian biorefineries", Biotechnology for Biofuels, 2017, vol. 10, article 30, 17 pages. (Year: 2017).*
Simo Ellila, Fonseca Lucas, Uchima Cristiane, Cota Junio, Goldman Gustavo Henrique, Salohemio Markku, Sacon Vera, Siika-aho Matti, "Development ofa low-cost cellulase production process using Trichoderma reesei forBrazilian biorefineries", Biotechnol Biofuels, (20170101), vol. 10, doi:10.1186/s13068-017-0717-0, p. 30, XP055411762.

(Continued)

*Primary Examiner* — Louise W Humphrey
*Assistant Examiner* — Deepa Mishra
(74) *Attorney, Agent, or Firm* — FisherBroyles, LLP; Jason P. Mueller

(57) ABSTRACT

The present invention relates to a novel strain of *Trichoderma* comprising genetic modifications that enable the improved production of an enzyme cocktail, involving at least upregulation of the transcription factor Xyr1 according to SEQ ID No. 1; disruption of the gene ACE1 according to SEQ ID No. 2; disruption of the gene SLP1 according to SEQ ID No. 3; and expression of the gene Cel3a from *Rasamsonia emersonii* according to SEQ ID No. 4.

6 Claims, 1 Drawing Sheet
Specification includes a Sequence Listing.

(56) References Cited

OTHER PUBLICATIONS

Andowski Christopher P., Huuskonen Anne, Wahl Ramon, Westerholm-Parvinen Ann, Kanerva Anne, Hänninen Anna-Liisa, Salovuori Noora, Penttila Merja, Natunen Jari, Ostermeier Christian, Helk Bernhard, Saarinen Juhani, Saloheimo Markku, "Enabling Low Cost Biopharmaceuticals: A Systematic Approach to Delete Proteases from a Well-Known Protein Production Host Trichoderma reesei", Plos One, vol. 10, No. 8, doi:10.1371/journal.pone.0134723, p. e0134723, XP055783669.

Kubicek Christian P; Mikus Marianna; Schuster Andre; Schmoll Monika; Seiboth Bernhard, "Metabolic engineering strategies for the improvement of cellulase production by Hypocrea jecorina", Biotechnology for Biofuels, BioMed Central Ltd, GB, GB, (Sep. 1, 2009), vol. 2, No. 1, doi:10.1186/1754-6834-2-19, ISSN 1754-6834, p. 19, XP021060605.

Wang et al., "Enhancing Cellulase Production in Trichoderma reesei RUT C30 Through Combined Manipulation of Activating and Repressing", J Ind Microbiol Biotechnol (2013) 40:633-641.

Ellila et al., "Development of a low-cost cellulase production process using Trichoderma reesei for Brazilian biorefineries", Biotechnol Biofuels (2017) 10:30.

Landowski et al., "Enabling Low Cost Biopharmaceuticals: A Systematic Approach to Delete Proteases from a Well-Known Protein Production Host Trichoderma reesei", PLoS One. Aug. 26, 2015;10(8):e0134723.

Simo Ellila, "Development of a low-cost cellulose production process using Trichoderma reesei for Brazilian biorefineries", «Biotechnol Biofuels», p. 2.

Fonseca Lucas Miranda et al., "Rational engineering of the Trichoderma reesei RUT-C30 strain into an industrially relevant platform for cellulase production", Biotechnology for Biofuels, vol. 13, No. 1, doi:10.1186/s13068-020-01732-w, (May 22, 2020), URL: https://link.springer.com/article/10.1186/s13068-020-01732-w/fulltext.html, XP093037486.

* cited by examiner

[Fig. 1]
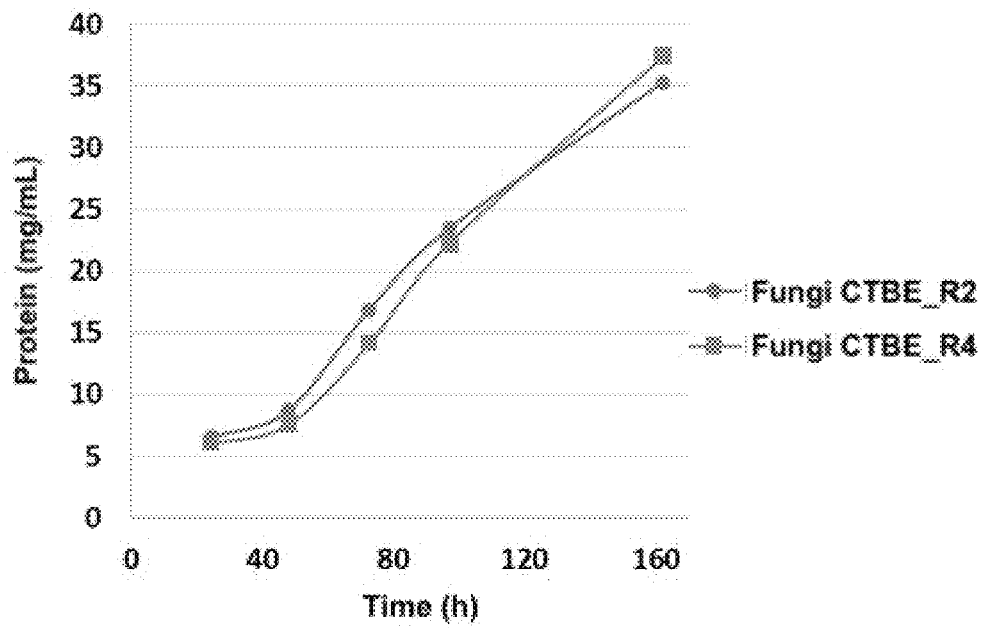
[Fig. 2]
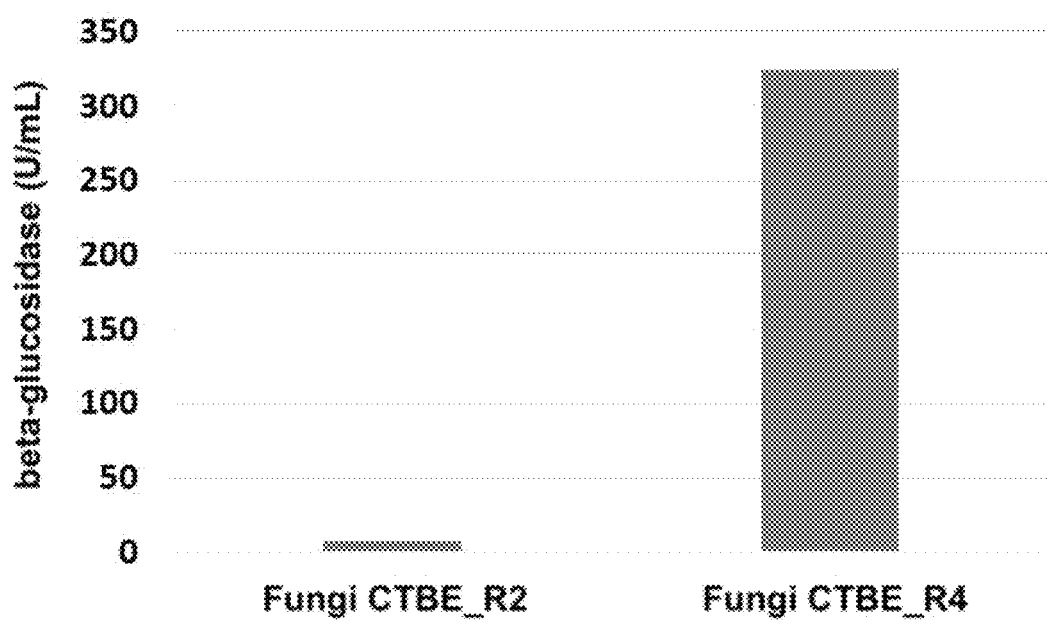

SEQUENCE LISTING

<160> NUMBER OF SEQ ID NOS: 6

<210> SEQ ID NO 1
<211> LENGTH: 920
<212> TYPE: PRT

<213> ORGANISM: Trichoderma reesei

<400> SEQUENCE: 1

```
Met Leu Ser Asn Pro Leu Arg Arg Tyr Ser Ala Tyr Pro Asp Ile Ser
1               5                   10                  15

Ser Ala Ser Phe Asp Pro Asn Tyr His Gly Ser Gln Ser His Leu His
            20                  25                  30

Ser Ile Asn Val Asn Thr Phe Gly Asn Ser His Pro Tyr Pro Met Gln
        35                  40                  45

His Leu Ala Gln His Ala Glu Leu Ser Ser Ser Arg Met Ile Arg Ala
    50                  55                  60

Ser Pro Val Gln Pro Lys Gln Arg Gln Gly Ser Leu Ile Ala Ala Arg
65                  70                  75                  80

Lys Asn Ser Thr Gly Thr Ala Gly Pro Ile Arg Arg Ile Ser Arg
                85                  90                  95

Ala Cys Asp Gln Cys Asn Gln Leu Arg Thr Lys Cys Asp Gly Leu His
            100                 105                 110

Pro Cys Ala His Cys Ile Glu Phe Gly Leu Gly Cys Glu Tyr Val Arg
        115                 120                 125

Glu Arg Lys Lys Arg Gly Lys Ala Ser Arg Lys Asp Ile Ala Ala Gln
    130                 135                 140

Gln Ala Ala Ala Ala Ala Gln His Ser Gly Gln Val Gln Asp Gly
145                 150                 155                 160

Pro Glu Asp Gln His Arg Lys Leu Ser Arg Gln Gln Ser Glu Ser Ser
                165                 170                 175

Arg Gly Ser Ala Glu Leu Ala Gln Pro Ala His Asp Pro Pro His Gly
            180                 185                 190

His Ile Glu Gly Ser Val Ser Ser Phe Ser Asp Asn Gly Leu Ser Gln
        195                 200                 205

His Ala Ala Met Gly Gly Met Asp Gly Leu Glu Asp His His Gly His
    210                 215                 220

Val Gly Val Asp Pro Ala Leu Gly Arg Thr Gln Leu Glu Ala Ser Ser
225                 230                 235                 240

Ala Met Gly Leu Gly Ala Tyr Gly Glu Val His Pro Gly Tyr Glu Ser
                245                 250                 255

Pro Gly Met Asn Gly His Val Met Val Pro Pro Ser Tyr Gly Ala Gln
            260                 265                 270

Thr Thr Met Ala Gly Tyr Ser Gly Ile Ser Tyr Ala Ala Gln Ala Pro
        275                 280                 285

Ser Pro Ala Thr Tyr Ser Ser Asp Gly Asn Phe Arg Leu Thr Gly His
    290                 295                 300

Ile His Asp Tyr Pro Leu Ala Asn Gly Ser Ser Pro Ser Trp Gly Gln
305                 310                 315                 320

Ser Asp Leu Arg Tyr Pro Val Leu Glu Pro Leu Pro His Leu Gly
                325                 330                 335

Asn Ile Leu Pro Val Ser Leu Ala Cys Asp Leu Ile Asp Leu Tyr Phe
            340                 345                 350

Ser Ser Ser Ser Ala Gln Met His Pro Met Ser Pro Tyr Val Leu
        355                 360                 365

Gly Phe Val Phe Arg Lys Arg Ser Phe Leu His Pro Thr Asn Pro Arg
    370                 375                 380

Arg Cys Gln Pro Ala Leu Leu Ala Ser Met Leu Trp Val Ala Ala Gln
385                 390                 395                 400
```

-continued

Thr Ser Glu Ala Ser Phe Leu Thr Ser Leu Pro Ser Ala Arg Ser Lys
            405                 410                 415

Val Cys Gln Lys Leu Leu Glu Leu Thr Val Gly Leu Leu Gln Pro Leu
        420                 425                 430

Ile His Thr Gly Thr Asn Ser Pro Ser Pro Lys Thr Ser Pro Val Val
            435                 440                 445

Gly Ala Ala Leu Gly Val Leu Gly Val Ala Met Pro Gly Ser Leu
450                 455                 460

Asn Met Asp Ser Leu Ala Gly Glu Thr Gly Ala Phe Gly Ala Ile Gly
465                 470                 475                 480

Ser Leu Asp Asp Val Ile Thr Tyr Val His Leu Ala Thr Val Val Ser
                485                 490                 495

Ala Ser Glu Tyr Lys Gly Ala Ser Leu Arg Trp Trp Gly Ala Ala Trp
            500                 505                 510

Ser Leu Ala Arg Glu Leu Lys Leu Gly Arg Glu Leu Pro Pro Gly Asn
        515                 520                 525

Pro Pro Ala Asn Gln Glu Asp Gly Glu Gly Leu Ser Glu Asp Val Asp
        530                 535                 540

Glu His Asp Leu Asn Arg Asn Asn Thr Arg Phe Val Thr Glu Glu Glu
545                 550                 555                 560

Arg Glu Glu Arg Arg Arg Ala Trp Trp Leu Val Tyr Ile Val Asp Arg
                565                 570                 575

His Leu Ala Leu Cys Tyr Asn Arg Pro Leu Phe Leu Leu Asp Ser Glu
            580                 585                 590

Cys Ser Asp Leu Tyr His Pro Met Asp Asp Ile Lys Trp Gln Ala Gly
        595                 600                 605

Lys Phe Arg Ser His Asp Ala Gly Asn Ser Ser Ile Asn Ile Asp Ser
610                 615                 620

Ser Met Thr Asp Glu Phe Gly Asp Ser Pro Arg Ala Ala Arg Gly Ala
625                 630                 635                 640

His Tyr Glu Cys Arg Gly Arg Ser Ile Phe Gly Tyr Phe Leu Ser Leu
            645                 650                 655

Met Thr Ile Leu Gly Glu Ile Val Asp Val His His Ala Lys Ser His
            660                 665                 670

Pro Arg Phe Gly Val Gly Phe Arg Ser Ala Arg Asp Trp Asp Glu Gln
        675                 680                 685

Val Ala Glu Ile Thr Arg His Leu Asp Met Tyr Glu Glu Ser Leu Lys
        690                 695                 700

Arg Phe Val Ala Lys His Leu Pro Leu Ser Ser Lys Asp Lys Glu Gln
705                 710                 715                 720

His Glu Met His Asp Ser Gly Ala Val Thr Asp Met Gln Ser Pro Leu
                725                 730                 735

Ser Val Arg Thr Asn Ala Ser Ser Arg Met Thr Glu Ser Glu Ile Gln
            740                 745                 750

Ala Ser Ile Val Val Ala Tyr Ser Thr His Val Met His Val Leu His
            755                 760                 765

Ile Leu Leu Ala Asp Lys Trp Asp Pro Ile Asn Leu Leu Asp Asp Asp
770                 775                 780

Asp Leu Trp Ile Ser Ser Glu Gly Phe Val Thr Ala Thr Ser His Ala
785                 790                 795                 800

Val Ser Ala Ala Glu Ala Ile Ser Gln Ile Leu Glu Phe Asp Pro Gly
                805                 810                 815

Leu Glu Phe Met Pro Phe Phe Tyr Gly Val Tyr Leu Leu Gln Gly Ser

```
                    820                 825                 830
Phe Leu Leu Leu Leu Ile Ala Asp Lys Leu Gln Ala Glu Ala Ser Pro
                835                 840                 845

Ser Val Ile Lys Ala Cys Glu Thr Ile Val Arg Ala His Glu Ala Cys
        850                 855                 860

Val Val Thr Leu Ser Thr Glu Tyr Gln Arg Asn Phe Ser Lys Val Met
865                 870                 875                 880

Arg Ser Ala Leu Ala Leu Ile Arg Gly Arg Val Pro Glu Asp Leu Ala
                885                 890                 895

Glu Gln Gln Gln Arg Arg Glu Leu Leu Ala Leu Tyr Arg Trp Thr
        900                 905                 910

Gly Asn Gly Thr Gly Leu Ala Leu
        915                 920

<210> SEQ ID NO 2
<211> LENGTH: 733
<212> TYPE: PRT
<213> ORGANISM: Trichoderma reesei

<400> SEQUENCE: 2

Met Ser Phe Ser Asn Pro Arg Arg Thr Pro Val Thr Arg Pro Gly
1               5                   10                  15

Thr Asp Cys Glu His Gly Leu Ser Leu Lys Thr Thr Met Thr Leu Arg
                20                  25                  30

Lys Gly Ala Thr Phe His Ser Pro Thr Ser Pro Ser Ala Ser Ser Ala
                35                  40                  45

Ala Gly Asp Phe Val Pro Pro Thr Leu Thr Arg Ser Gln Ser Ala Phe
        50                  55                  60

Asp Asp Val Val Asp Ala Ser Arg Arg Arg Ile Ala Met Thr Leu Asn
65                  70                  75                  80

Asp Ile Asp Glu Ala Leu Ser Lys Ala Ser Leu Ser Asp Lys Ser Pro
                85                  90                  95

Arg Pro Lys Pro Leu Arg Asp Thr Ser Leu Pro Val Pro Arg Gly Phe
                100                 105                 110

Leu Glu Pro Pro Val Val Asp Pro Ala Met Asn Lys Gln Glu Pro Glu
        115                 120                 125

Arg Arg Val Leu Arg Pro Arg Ser Val Arg Arg Thr Arg Asn His Ala
130                 135                 140

Ser Asp Ser Gly Ile Gly Ser Ser Val Val Ser Thr Asn Asp Lys Ala
145                 150                 155                 160

Gly Ala Ala Asp Ser Thr Lys Lys Pro Gln Ala Ser Ala Leu Thr Arg
                165                 170                 175

Ser Ala Ala Ser Ser Thr Thr Ala Met Leu Pro Ser Leu Ser His Arg
                180                 185                 190

Ala Val Asn Arg Ile Arg Glu His Thr Leu Arg Pro Leu Leu Glu Lys
                195                 200                 205

Pro Thr Leu Lys Glu Phe Glu Pro Ile Val Leu Asp Val Pro Arg Arg
        210                 215                 220

Ile Arg Ser Lys Glu Ile Ile Cys Leu Arg Asp Leu Glu Lys Thr Leu
225                 230                 235                 240

Ile Phe Met Ala Pro Glu Lys Ala Lys Ser Ala Ala Leu Tyr Leu Asp
                245                 250                 255

Phe Cys Leu Thr Ser Val Arg Cys Ile Gln Ala Thr Val Glu Tyr Leu
                260                 265                 270
```

-continued

Thr Asp Arg Glu Gln Val Arg Pro Gly Asp Arg Pro Tyr Thr Asn Gly
            275                 280                 285

Tyr Phe Ile Asp Leu Lys Glu Gln Ile Tyr Gln Tyr Gly Lys Gln Leu
        290                 295                 300

Ala Ala Ile Lys Glu Lys Gly Ser Leu Ala Asp Asp Met Asp Ile Asp
305                 310                 315                 320

Pro Ser Asp Glu Val Arg Leu Tyr Gly Gly Val Ala Glu Asn Gly Arg
                325                 330                 335

Pro Ala Glu Leu Ile Arg Val Lys Lys Asp Gly Thr Ala Tyr Ser Met
            340                 345                 350

Ala Thr Gly Lys Ile Val Asp Met Thr Glu Ser Pro Thr Pro Leu Lys
        355                 360                 365

Arg Ser Leu Ser Glu Gln Arg Glu Asp Glu Glu Ile Met Arg Ser
370                 375                 380

Met Ala Arg Arg Lys Lys Asn Ala Thr Pro Glu Asp Val Ala Pro Lys
385                 390                 395                 400

Lys Cys Arg Glu Pro Gly Cys Thr Lys Glu Phe Lys Arg Pro Cys Asp
                405                 410                 415

Leu Thr Lys His Glu Lys Thr His Ser Arg Pro Trp Lys Cys Pro Ile
            420                 425                 430

Pro Thr Cys Lys Tyr His Glu Tyr Gly Trp Pro Thr Glu Lys Glu Met
        435                 440                 445

Asp Arg His Ile Asn Asp Lys His Ser Asp Ala Pro Ala Met Tyr Glu
        450                 455                 460

Cys Leu Phe Lys Pro Cys Pro Tyr Lys Ser Lys Arg Glu Ser Asn Cys
465                 470                 475                 480

Lys Gln His Met Glu Lys Ala His Gly Trp Thr Tyr Val Arg Thr Lys
                485                 490                 495

Thr Asn Gly Lys Lys Ala Pro Ser Gln Asn Gly Ser Thr Ala Gln Gln
            500                 505                 510

Thr Pro Pro Leu Ala Asn Val Ser Thr Pro Ser Ser Thr Pro Ser Tyr
        515                 520                 525

Ser Val Pro Thr Pro Pro Gln Asp Gln Val Met Ser Thr Asp Phe Pro
530                 535                 540

Met Tyr Pro Ala Asp Asp Asp Trp Leu Ala Thr Tyr Gly Ala Gln Pro
545                 550                 555                 560

Asn Thr Ile Asp Ala Met Asp Leu Gly Leu Glu Asn Leu Ser Pro Ala
                565                 570                 575

Ser Ala Ala Ser Ser Tyr Glu Gln Tyr Pro Pro Tyr Gln Asn Gly Ser
            580                 585                 590

Thr Phe Ile Ile Asn Asp Glu Asp Ile Tyr Ala Ala His Val Gln Ile
        595                 600                 605

Pro Ala Gln Leu Pro Thr Pro Glu Gln Val Tyr Thr Lys Met Met Pro
610                 615                 620

Gln Gln Met Pro Val Tyr His Val Gln Gln Pro Cys Thr Thr Val
625                 630                 635                 640

Pro Ile Leu Gly Glu Pro Gln Phe Ser Pro Asn Ala Gln Asn Ala
                645                 650                 655

Val Leu Tyr Thr Pro Thr Ser Leu Arg Glu Val Asp Glu Gly Phe Asp
            660                 665                 670

Glu Ser Tyr Ala Ala Asp Gly Ala Asp Phe Gln Leu Phe Pro Ala Thr
        675                 680                 685

Val Asp Lys Thr Asp Val Phe Gln Ser Leu Phe Thr Asp Met Pro Ser

```
            690                 695                 700
Ala Asn Leu Gly Phe Ser Gln Thr Thr Gln Pro Asp Ile Phe Asn Gln
705                 710                 715                 720

Ile Asp Trp Ser Asn Leu Asp Tyr Gln Gly Phe Gln Glu
                725                 730
```

<210> SEQ ID NO 3
<211> LENGTH: 882
<212> TYPE: PRT
<213> ORGANISM: Trichoderma reesei

<400> SEQUENCE: 3

```
Met Val Arg Ser Ala Leu Phe Val Ser Leu Leu Ala Thr Phe Ser Gly
1               5                   10                  15

Val Ile Ala Arg Val Ser Gly His Gly Ser Lys Ile Val Pro Gly Ala
                20                  25                  30

Tyr Ile Phe Glu Phe Glu Asp Ser Gln Asp Thr Ala Asp Phe Tyr Lys
                    35                  40                  45

Lys Leu Asn Gly Glu Gly Ser Thr Arg Leu Lys Phe Asp Tyr Lys Leu
50                  55                  60

Phe Lys Gly Val Ser Val Gln Leu Lys Asp Leu Asp Asn His Glu Ala
65                  70                  75                  80

Lys Ala Gln Gln Met Ala Gln Leu Pro Ala Val Lys Asn Val Trp Pro
                85                  90                  95

Val Thr Leu Ile Asp Ala Pro Asn Pro Lys Val Glu Trp Val Ala Gly
                100                 105                 110

Ser Thr Ala Pro Thr Leu Glu Ser Arg Ala Ile Lys Lys Pro Pro Ile
                115                 120                 125

Pro Asn Asp Ser Ser Asp Phe Pro Thr His Gln Met Thr Gln Ile Asp
130                 135                 140

Lys Leu Arg Ala Lys Gly Tyr Thr Gly Lys Gly Val Arg Val Ala Val
145                 150                 155                 160

Ile Asp Thr Gly Ile Asp Tyr Thr His Pro Ala Leu Gly Gly Cys Phe
                165                 170                 175

Gly Arg Gly Cys Leu Val Ser Phe Gly Thr Asp Leu Val Gly Asp Asp
                180                 185                 190

Tyr Thr Gly Phe Asn Thr Pro Val Pro Asp Asp Pro Val Asp Cys
                195                 200                 205

Ala Gly His Gly Ser His Val Ala Gly Ile Ile Ala Ala Gln Glu Asn
                210                 215                 220

Pro Tyr Gly Phe Thr Gly Ala Pro Asp Val Thr Leu Gly Ala Tyr
225                 230                 235                 240

Arg Val Phe Gly Cys Asp Gly Gln Ala Gly Asn Asp Val Leu Ile Ser
                245                 250                 255

Ala Tyr Asn Gln Ala Phe Glu Asp Gly Ala Gln Ile Ile Thr Ala Ser
                260                 265                 270

Ile Gly Gly Pro Ser Gly Trp Ala Glu Glu Pro Trp Ala Val Ala Val
                275                 280                 285

Thr Arg Ile Val Glu Ala Gly Val Pro Cys Thr Val Ser Ala Gly Asn
                290                 295                 300

Glu Gly Asp Ser Gly Leu Phe Phe Ala Ser Thr Ala Ala Asn Gly Lys
305                 310                 315                 320

Lys Val Ile Ala Val Ala Ser Val Asp Asn Glu Asn Ile Pro Ser Val
                325                 330                 335
```

```
Leu Ser Val Ala Ser Tyr Lys Ile Asp Ser Gly Ala Ala Gln Asp Phe
            340                 345                 350

Gly Tyr Val Ser Ser Lys Ala Trp Asp Gly Val Ser Lys Pro Leu
            355                 360                 365

Tyr Ala Val Ser Phe Asp Thr Thr Ile Pro Asp Asp Gly Cys Ser Pro
            370                 375                 380

Leu Pro Asp Ser Thr Pro Asp Leu Ser Asp Tyr Ile Val Leu Val Arg
385                     390                 395                 400

Arg Gly Thr Cys Thr Phe Val Gln Lys Ala Gln Asn Val Ala Ala Lys
                405                 410                 415

Gly Ala Lys Tyr Leu Leu Tyr Tyr Asn Asn Ile Pro Gly Ala Leu Ala
            420                 425                 430

Val Asp Val Ser Ala Val Pro Glu Ile Glu Ala Val Gly Met Val Asp
            435                 440                 445

Asp Lys Thr Gly Ala Thr Trp Ile Ala Ala Leu Lys Asp Gly Lys Thr
            450                 455                 460

Val Thr Leu Thr Leu Thr Asp Pro Ile Glu Ser Glu Lys Gln Ile Gln
465                 470                 475                 480

Phe Ser Asp Asn Pro Thr Thr Gly Gly Ala Leu Ser Gly Tyr Thr Thr
                485                 490                 495

Trp Gly Pro Thr Trp Glu Leu Asp Val Lys Pro Gln Ile Ser Ser Pro
                500                 505                 510

Gly Gly Asn Ile Leu Ser Thr Tyr Pro Val Ala Leu Gly Gly Tyr Ala
            515                 520                 525

Thr Leu Ser Gly Thr Ser Met Ala Cys Pro Leu Thr Ala Ala Ala Val
530                 535                     540

Ala Leu Ile Gly Gln Ala Arg Gly Thr Phe Asp Pro Ala Leu Ile Asp
545                 550                 555                 560

Asn Leu Ala Thr Thr Ala Asn Pro Gln Leu Phe Asn Asp Gly Glu
                565                 570                 575

Lys Phe Tyr Asp Phe Leu Ala Pro Val Pro Gln Gln Gly Gly Gly Leu
            580                 585                 590

Ile Gln Ala Tyr Asp Ala Ala Phe Ala Thr Thr Leu Leu Ser Pro Ser
            595                 600                 605

Ser Leu Ser Phe Asn Asp Thr Asp His Phe Ile Lys Lys Lys Gln Ile
            610                 615                 620

Thr Leu Lys Asn Thr Ser Lys Gln Arg Val Thr Tyr Lys Leu Asn His
625                 630                 635                 640

Val Pro Thr Asn Thr Phe Tyr Thr Leu Ala Pro Gly Asn Gly Tyr Pro
            645                 650                 655

Ala Pro Phe Pro Asn Asp Ala Val Ala Ala His Ala Asn Leu Lys Phe
                660                 665                 670

Asn Leu Gln Gln Val Thr Leu Pro Ala Gly Arg Ser Ile Thr Val Asp
            675                 680                 685

Val Phe Pro Thr Pro Arg Asp Val Asp Ala Lys Arg Leu Ala Leu
            690                 695                 700

Trp Ser Gly Tyr Ile Thr Val Asn Gly Thr Asp Gly Thr Ser Leu Ser
705                 710                 715                 720

Val Pro Tyr Gln Gly Leu Thr Gly Ser Leu His Lys Gln Lys Val Leu
                725                 730                 735

Tyr Pro Glu Asp Ser Trp Ile Ala Asp Ser Thr Asp Glu Ser Leu Ala
                740                 745                 750

Pro Val Glu Asn Gly Thr Val Phe Thr Ile Pro Ala Pro Gly Asn Ala
```

```
              755                 760                 765
Gly Pro Asp Asp Lys Leu Pro Ser Leu Val Ser Pro Ala Leu Gly
        770                 775                 780

Ser Arg Tyr Val Arg Val Asp Leu Val Leu Ser Ala Pro His
785                 790                 795                 800

Gly Thr Lys Leu Lys Thr Val Lys Phe Leu Asp Thr Thr Ser Ile Gly
                805                 810                 815

Gln Pro Ala Gly Ser Pro Leu Leu Trp Ile Ser Arg Gly Ala Asn Pro
        820                 825                 830

Ile Ala Trp Thr Gly Glu Leu Ser Asp Asn Lys Phe Ala Pro Pro Gly
                835                 840                 845

Thr Tyr Lys Ala Val Phe His Ala Leu Arg Ile Phe Gly Asn Glu Lys
        850                 855                 860

Lys Lys Glu Asp Trp Asp Val Ser Glu Ser Pro Ala Phe Thr Ile Lys
865                 870                 875                 880

Tyr Ala

<210> SEQ ID NO 4
<211> LENGTH: 857
<212> TYPE: PRT
<213> ORGANISM: Trichoderma reesei

<400> SEQUENCE: 4

Met Arg Asn Gly Leu Leu Lys Val Ala Ala Leu Ala Ala Ala Ser Ala
1               5                   10                  15

Val Asn Gly Glu Asn Leu Ala Tyr Ser Pro Pro Phe Tyr Pro Ser Pro
            20                  25                  30

Trp Ala Asn Gly Gln Gly Asp Trp Ala Glu Ala Tyr Gln Lys Ala Val
        35                  40                  45

Gln Phe Val Ser Gln Leu Thr Leu Ala Glu Lys Val Asn Leu Thr Thr
    50                  55                  60

Gly Thr Gly Trp Glu Gln Asp Arg Cys Val Gly Gln Val Gly Ser Ile
65                  70                  75                  80

Pro Arg Leu Gly Phe Pro Gly Leu Cys Met Gln Asp Ser Pro Leu Gly
                85                  90                  95

Val Arg Asp Thr Asp Tyr Asn Ser Ala Phe Pro Ala Gly Val Asn Val
            100                 105                 110

Ala Ala Thr Trp Asp Arg Asn Leu Ala Tyr Arg Arg Gly Val Ala Met
        115                 120                 125

Gly Glu Glu His Arg Gly Lys Gly Val Asp Val Gln Leu Gly Pro Val
    130                 135                 140

Ala Gly Pro Leu Gly Arg Ser Pro Asp Ala Gly Arg Asn Trp Glu Gly
145                 150                 155                 160

Phe Ala Pro Asp Pro Val Leu Thr Gly Asn Met Met Ala Ser Thr Ile
                165                 170                 175

Gln Gly Ile Gln Asp Ala Gly Val Ile Ala Cys Ala Lys His Phe Ile
            180                 185                 190

Leu Tyr Glu Gln Glu His Phe Arg Gln Gly Ala Gln Asp Gly Tyr Asp
        195                 200                 205

Ile Ser Asp Ser Ile Ser Ala Asn Ala Asp Lys Thr Met His Glu
    210                 215                 220

Leu Tyr Leu Trp Pro Phe Ala Asp Ala Val Arg Ala Gly Val Gly Ser
225                 230                 235                 240

Val Met Cys Ser Tyr Asn Gln Val Asn Asn Ser Tyr Ala Cys Ser Asn
```

```
            245                 250                 255
Ser Tyr Thr Met Asn Lys Leu Leu Lys Ser Glu Leu Gly Phe Gln Gly
            260                 265                 270

Phe Val Met Thr Asp Trp Gly His His Ser Gly Val Gly Ser Ala
            275                 280                 285

Leu Ala Gly Leu Asp Met Ser Met Pro Gly Asp Ile Ala Phe Asp Ser
            290                 295                 300

Gly Thr Ser Phe Trp Gly Thr Asn Leu Thr Val Ala Val Leu Asn Gly
305                 310                 315                 320

Ser Ile Pro Glu Trp Arg Val Asp Met Ala Val Arg Ile Met Ser
                325                 330                 335

Ala Tyr Tyr Lys Val Gly Arg Asp Arg Tyr Ser Val Pro Ile Asn Phe
                340                 345                 350

Asp Ser Trp Thr Leu Asp Thr Tyr Gly Pro Glu His Tyr Ala Val Gly
                355                 360                 365

Gln Gly Gln Thr Lys Ile Asn Glu His Val Asp Val Arg Gly Asn His
            370                 375                 380

Ala Glu Ile Ile His Glu Ile Gly Ala Ala Ser Ala Val Leu Leu Lys
385                 390                 395                 400

Asn Lys Gly Gly Leu Pro Leu Thr Gly Thr Glu Arg Phe Val Gly Val
                405                 410                 415

Phe Gly Lys Asp Ala Gly Ser Asn Pro Trp Gly Val Asn Gly Cys Ser
                420                 425                 430

Asp Arg Gly Cys Asp Asn Gly Thr Leu Ala Met Gly Trp Gly Ser Gly
            435                 440                 445

Thr Ala Asn Phe Pro Tyr Leu Val Thr Pro Glu Gln Ala Ile Gln Arg
            450                 455                 460

Glu Val Leu Ser Arg Asn Gly Thr Phe Thr Gly Ile Thr Asp Asn Gly
465                 470                 475                 480

Ala Leu Ala Glu Met Ala Ala Ala Ser Gln Ala Asp Thr Cys Leu
                485                 490                 495

Val Phe Ala Asn Ala Asp Ser Gly Glu Gly Tyr Ile Thr Val Asp Gly
                500                 505                 510

Asn Glu Gly Asp Arg Lys Asn Leu Thr Leu Trp Gln Gly Ala Asp Gln
            515                 520                 525

Val Ile His Asn Val Ser Ala Asn Cys Asn Asn Thr Val Val Leu
            530                 535                 540

His Thr Val Gly Pro Val Leu Ile Asp Asp Trp Tyr Asp His Pro Asn
545                 550                 555                 560

Val Thr Ala Ile Leu Trp Ala Gly Leu Pro Gly Gln Glu Ser Gly Asn
                565                 570                 575

Ser Leu Val Asp Val Leu Tyr Gly Arg Val Asn Pro Gly Lys Thr Pro
                580                 585                 590

Phe Thr Trp Gly Arg Ala Arg Asp Asp Tyr Gly Ala Pro Leu Ile Val
                595                 600                 605

Lys Pro Asn Asn Gly Lys Gly Ala Pro Gln Gln Asp Phe Thr Glu Gly
                610                 615                 620

Ile Phe Ile Asp Tyr Arg Arg Phe Asp Lys Tyr Asn Ile Thr Pro Ile
625                 630                 635                 640

Tyr Glu Phe Gly Phe Gly Leu Ser Tyr Thr Thr Phe Glu Phe Ser Gln
                645                 650                 655

Leu Asn Val Gln Pro Ile Asn Ala Pro Pro Tyr Thr Pro Ala Ser Gly
                660                 665                 670
```

```
Phe Thr Lys Ala Ala Gln Ser Phe Gly Gln Pro Ser Asn Ala Ser Asp
            675                 680                 685

Asn Leu Tyr Pro Ser Asp Ile Glu Arg Val Pro Leu Tyr Ile Tyr Pro
    690                 695                 700

Trp Leu Asn Ser Thr Asp Leu Lys Ala Ser Ala Asn Asp Pro Asp Tyr
705                 710                 715                 720

Gly Leu Pro Thr Glu Lys Tyr Val Pro Pro Asn Ala Thr Asn Gly Asp
                725                 730                 735

Pro Gln Pro Ile Asp Pro Ala Gly Ala Pro Gly Gly Asn Pro Ser
            740                 745                 750

Leu Tyr Glu Pro Val Ala Arg Val Thr Thr Ile Ile Thr Asn Thr Gly
    755                 760                 765

Lys Val Thr Gly Asp Glu Val Pro Gln Leu Tyr Val Ser Leu Gly Gly
    770                 775                 780

Pro Asp Asp Ala Pro Lys Val Leu Arg Gly Phe Asp Arg Ile Thr Leu
785                 790                 795                 800

Ala Pro Gly Gln Gln Tyr Leu Trp Thr Thr Thr Leu Thr Arg Arg Asp
                805                 810                 815

Ile Ser Asn Trp Asp Pro Val Thr Gln Asn Trp Val Val Thr Asn Tyr
            820                 825                 830

Thr Lys Thr Ile Tyr Val Gly Asn Ser Ser Arg Asn Leu Pro Leu Gln
            835                 840                 845

Ala Pro Leu Lys Pro Tyr Pro Gly Ile
850                 855
```

<210> SEQ ID NO 5
<211> LENGTH: 407
<212> TYPE: PRT
<213> ORGANISM: Trichoderma reesei

<400> SEQUENCE: 5

```
Met Gln Thr Phe Gly Ala Phe Leu Val Ser Phe Leu Ala Ala Ser Gly
1               5                   10                  15

Leu Ala Ala Ala Leu Pro Thr Glu Gly Gln Lys Thr Ala Ser Val Glu
                20                  25                  30

Val Gln Tyr Asn Lys Asn Tyr Val Pro His Gly Pro Thr Ala Leu Phe
            35                  40                  45

Lys Ala Lys Arg Lys Tyr Gly Ala Pro Ile Ser Asp Asn Leu Lys Ser
    50                  55                  60

Leu Val Ala Ala Arg Gln Ala Lys Gln Ala Leu Ala Lys Arg Gln Thr
65                  70                  75                  80

Gly Ser Ala Pro Asn His Pro Ser Asp Ser Ala Asp Ser Glu Tyr Ile
                85                  90                  95

Thr Ser Val Ser Ile Gly Thr Pro Ala Gln Val Leu Pro Leu Asp Phe
            100                 105                 110

Asp Thr Gly Ser Ser Asp Leu Trp Val Phe Ser Ser Glu Thr Pro Lys
    115                 120                 125

Ser Ser Ala Thr Gly His Ala Ile Tyr Thr Pro Ser Lys Ser Ser Thr
130                 135                 140

Ser Lys Lys Val Ser Gly Ala Ser Trp Ser Ile Ser Tyr Gly Asp Gly
145                 150                 155                 160

Ser Ser Ser Ser Gly Asp Val Tyr Thr Asp Lys Val Thr Ile Gly Gly
                165                 170                 175

Phe Ser Val Asn Thr Gln Gly Val Glu Ser Ala Thr Arg Val Ser Thr
```

```
            180                 185                 190
Glu Phe Gln Asp Thr Val Ile Ser Gly Leu Val Gly Leu Ala Phe
        195                 200                 205

Asp Ser Gly Asn Gln Val Arg Pro His Pro Gln Lys Thr Trp Phe Ser
    210                 215                 220

Asn Ala Ala Ser Ser Leu Ala Glu Pro Leu Phe Thr Ala Asp Leu Arg
225                 230                 235                 240

His Gly Gln Asn Gly Ser Tyr Asn Phe Gly Tyr Ile Asp Thr Ser Val
                245                 250                 255

Ala Lys Gly Pro Val Ala Tyr Thr Pro Val Asp Asn Ser Gln Gly Phe
            260                 265                 270

Trp Glu Phe Thr Ala Ser Gly Tyr Ser Val Gly Gly Lys Leu Asn
        275                 280                 285

Arg Asn Ser Ile Asp Gly Ile Ala Asp Thr Gly Thr Thr Leu Leu Leu
    290                 295                 300

Leu Asp Asp Asn Val Val Asp Ala Tyr Ala Asn Val Gln Ser Ala
305                 310                 315                 320

Gln Tyr Asp Asn Gln Gln Glu Gly Val Val Phe Asp Cys Asp Glu Asp
                325                 330                 335

Leu Pro Ser Phe Ser Phe Gly Val Gly Ser Ser Thr Ile Thr Ile Pro
            340                 345                 350

Gly Asp Leu Leu Asn Leu Thr Pro Leu Glu Glu Gly Ser Ser Thr Cys
        355                 360                 365

Phe Gly Gly Leu Gln Ser Ser Ser Gly Ile Gly Ile Asn Ile Phe Gly
    370                 375                 380

Asp Val Ala Leu Lys Ala Ala Leu Val Val Phe Asp Leu Gly Asn Glu
385                 390                 395                 400

Arg Leu Gly Trp Ala Gln Lys
                405

<210> SEQ ID NO 6
<211> LENGTH: 628
<212> TYPE: PRT
<213> ORGANISM: Trichoderma reesei

<400> SEQUENCE: 6

Met Lys Leu Gln Thr Ala Ser Val Leu Leu Gly Ser Ala Ala Ala
1               5                   10                  15

Ser Pro Ser Met Gln Thr Arg Ala Ser Val Val Ile Asp Tyr Asn Val
            20                  25                  30

Ala Pro Pro Asn Leu Ser Thr Leu Pro Asn Gly Ser Leu Phe Glu Thr
        35                  40                  45

Trp Arg Pro Arg Ala His Val Leu Pro Pro Asn Gly Gln Ile Gly Asp
    50                  55                  60

Pro Cys Leu His Tyr Thr Asp Pro Ser Thr Gly Leu Phe His Val Gly
65              70                  75                  80

Phe Leu His Asp Gly Ser Gly Ile Ser Ser Ala Thr Thr Asp Asp Leu
                85                  90                  95

Ala Thr Tyr Lys Asp Leu Asn Gln Gly Asn Gln Val Ile Val Pro Gly
            100                 105                 110

Gly Ile Asn Asp Pro Val Ala Val Phe Asp Gly Ser Val Ile Pro Ser
        115                 120                 125

Gly Ile Asn Gly Leu Pro Thr Leu Leu Tyr Thr Ser Val Ser Phe Leu
    130                 135                 140
```

-continued

```
Pro Ile His Trp Ser Ile Pro Tyr Thr Arg Gly Ser Glu Thr Gln Ser
145                 150                 155                 160

Leu Ala Val Ser Ser Asp Gly Ser Asn Phe Thr Lys Leu Asp Gln
                165                 170                 175

Gly Pro Val Ile Pro Gly Pro Phe Ala Tyr Asn Val Thr Ala Phe
            180                 185                 190

Arg Asp Pro Tyr Val Phe Gln Asn Pro Thr Leu Asp Ser Leu Leu His
        195                 200                 205

Ser Lys Asn Asn Thr Trp Tyr Thr Val Ile Ser Gly Gly Leu His Gly
    210                 215                 220

Lys Gly Pro Ala Gln Phe Leu Tyr Arg Gln Tyr Asp Pro Asp Phe Gln
225                 230                 235                 240

Tyr Trp Glu Phe Leu Gly Gln Trp Trp His Glu Pro Thr Asn Ser Thr
                245                 250                 255

Trp Gly Asn Gly Thr Trp Ala Gly Arg Trp Ala Phe Asn Phe Glu Thr
                260                 265                 270

Gly Asn Val Phe Ser Leu Asp Glu Tyr Gly Tyr Asn Pro His Gly Gln
            275                 280                 285

Ile Phe Ser Thr Ile Gly Thr Glu Gly Ser Asp Gln Pro Val Val Pro
290                 295                 300

Gln Leu Thr Ser Ile His Asp Met Leu Trp Val Ser Gly Asn Val Ser
305                 310                 315                 320

Arg Asn Gly Ser Val Ser Phe Thr Pro Asn Met Ala Gly Phe Leu Asp
                325                 330                 335

Trp Gly Phe Ser Ser Tyr Ala Ala Ala Gly Lys Val Leu Pro Ser Thr
                340                 345                 350

Ser Leu Pro Ser Thr Lys Ser Gly Ala Pro Asp Arg Phe Ile Ser Tyr
                355                 360                 365

Val Trp Leu Ser Gly Asp Leu Phe Glu Gln Ala Glu Gly Phe Pro Thr
            370                 375                 380

Asn Gln Gln Asn Trp Thr Gly Thr Leu Leu Pro Arg Glu Leu Arg
385                 390                 395                 400

Val Leu Tyr Ile Pro Asn Val Val Asp Asn Ala Leu Ala Arg Glu Ser
                405                 410                 415

Gly Ala Ser Trp Gln Val Val Ser Ser Asp Ser Ser Ala Gly Thr Val
            420                 425                 430

Glu Leu Gln Thr Leu Gly Ile Ser Ile Ala Arg Glu Thr Lys Ala Ala
        435                 440                 445

Leu Leu Ser Gly Thr Ser Phe Thr Glu Ser Asp Arg Thr Leu Asn Ser
    450                 455                 460

Ser Gly Val Val Pro Phe Lys Arg Ser Pro Ser Glu Lys Phe Phe Val
465                 470                 475                 480

Leu Ser Ala Gln Leu Ser Phe Pro Ala Ser Ala Arg Gly Ser Gly Leu
                485                 490                 495

Lys Ser Gly Phe Gln Ile Leu Ser Ser Glu Leu Glu Ser Thr Thr Val
            500                 505                 510

Tyr Tyr Gln Phe Ser Asn Glu Ser Ile Ile Val Asp Arg Ser Asn Thr
        515                 520                 525

Ser Ala Ala Arg Thr Thr Asp Gly Ile Asp Ser Ser Ala Glu Ala
    530                 535                 540

Gly Lys Leu Arg Leu Phe Asp Val Leu Asn Gly Gly Glu Gln Ala Ile
545                 550                 555                 560

Glu Thr Leu Asp Leu Thr Leu Val Val Asp Asn Ser Val Leu Glu Ile
```

|  |  |  | 565 |  |  |  |  | 570 |  |  |  |  | 575 |  |  |
|---|---|---|---|---|---|---|---|---|---|---|---|---|---|---|---|
| Tyr | Ala | Asn | Gly | Arg | Phe | Ala | Leu | Ser | Thr | Trp | Val | Arg | Ser | Trp | Tyr |
|  |  |  | 580 |  |  |  |  | 585 |  |  |  |  | 590 |  |  |
| Ala | Asn | Ser | Thr | Asn | Ile | Ser | Phe | Phe | Gln | Asn | Gly | Val | Gly | Gly | Val |
|  |  | 595 |  |  |  |  | 600 |  |  |  |  | 605 |  |  |  |
| Ala | Phe | Ser | Asn | Val | Thr | Val | Ser | Glu | Gly | Leu | Tyr | Asp | Ala | Trp | Pro |
|  | 610 |  |  |  |  | 615 |  |  |  |  | 620 |  |  |  |  |
| Asp | Arg | Gln | Ser |  |  |  |  |  |  |  |  |  |  |  |  |
| 625 |  |  |  |  |  |  |  |  |  |  |  |  |  |  |  |

MODIFIED *TRICHODERMA* FUNGAL STRAIN FOR THE PRODUCTION OF AN ENZYME COCKTAIL

TECHNICAL DOMAIN

The present invention refers to a new strain of *Trichoderma* comprising genetic modifications that enables the improved production of enzymatic cocktails.

PRIOR ART

Cellulases or hemicellulases are enzymes that constitute a complex capable of acting on cellulosic materials, promoting their hydrolysis. Such enzymes are highly specific biocatalysts that act in the release of sugars, of which glucose is the one that raises the greatest industrial interest, due to the possibility of its conversion into ethanol. The efficient production of cellulases is important for the definition of a biorefinery, which uses renewable lignocellulosic materials to produce fuel and chemicals with high added value.

Due to its industrial importance, in the recent decades several studies have been published about the factors that affect the production of these enzymes and their ideal culture medium. That is because in the context of ethanol production from lignocellulosic materials, cellulases are inputs that impact the process and can represent a significant operating cost for a plant.

In order to increase the levels of enzyme production, different techniques can be used, among which the most common concerning cellulases are the selection of fungi, either by classical (random) mutation or by gene expression. The classic mutation has been applied for decades to fungal strains such as *Trichoderma*.

In this sense, *Trichoderma reesei* (Martinez D. et al. (2008) Genome sequencing and analysis of the biomass-degrading fungus *Trichoderma reesei*. Nat Biotechnol. 26, 553-560), a mesophilic and filamentous fungus, anamorph from the fungus *Hypocrea jecorina*, has been being generated several strains with particular properties, among which the most reported is the Rut C30 strain (Koike H. et al. (2013) Comparative genomics analysis of *Trichoderma reesei* strains. Ind. Biotech. 9(6):352-367). This strain had its cellulolytic potential increased due to the mutation of the cre1 gene (causing lesser effect of catabolic repression of glucose by the cells, during the expression of enzymes) and to the increase in the amount of endoplasmic reticulum (promoting an increase in the rates of O-glycosylation of proteins).

It has been shown that the *Trichoderma* is useful as a host cell for the recombinant production of polypeptides having biological activity. Several publications teach genetic modifications with the disruption or overexpression of one or more specific genes, seeking to improve their activity (international publications WO9823642, WO17177289, WO11075677, WO10022518, among others).

However, the performance in the activity of the enzyme cocktail produced by such fungi remains a challenge, so that new strains incorporating the selection of gene modifications for improved production of enzyme cocktails are highly desired.

BRIEF DESCRIPTION OF DRAWINGS

FIG. 1 shows the production of enzymes by the strains of fungi called CTBE_R2 (comparative) and CTBE_R4 (according to the present invention), through cultivation in bioreactors containing molasses, yeast extract, and ammonium sulfate.

FIG. 2 shows the beta-glucosidase activity of enzyme cocktails produced by fungi called CTBE_R2 (comparative) and CTBE_R4 (according to the present invention) through cultivation in bioreactors containing molasses, yeast extract, and ammonium sulfate.

SUMMARY OF THE INVENTION

The present invention relates to a new strain of *Trichoderma* comprising a selection of gene modifications, which enables the improved production of enzymatic cocktails, comprising at least: overexpression of transcription factor Xyr1, as defined in SEQ ID No. 1; disruption of the ACE1 gene according to SEQ ID No. 2; disruption of the SLP1 gene according to SEQ ID No. 3; and expression of the Cel3a gene from *Rasamsonia emersonii* according to SEQ ID No. 4.

Additionally, the new *Trichoderma* strain according to the present invention may comprise: disruption of the PEP1 gene according to SEQ ID No. 5; and/or expression of the SucA gene from *Aspergillus niger* according to SEQ ID No. 6.

DESCRIPTION OF THE EMBODIMENTS

New *Trichoderma* strains can be engineered by gene deletion techniques to eliminate or reduce gene expression. Gene deletion techniques allow for partial or complete removal of the gene thereby eliminating its expression. In such methods, gene deletion is performed by homologous recombination by using a plasmid that has been engineered to contiguously contain the 5' and 3' regions flanking the gene.

These new *Trichoderma* mutants can also be engineered by introduction, substitution, overexpression, and/or removal of one or more (several) nucleotides in the gene or a control sequence required for its transcription or translation. For example, nucleotides can be inserted or removed for the introduction of a stop codon, the removal of the initiation codon, or a displacement from the open reading matrix.

Gene disruption techniques are also available. New *Trichoderma* strains can also be engineered by inserting into the gene a disruptive nucleic acid construct comprising a nucleic acid fragment homologous to the gene which will produce a duplication of the homology region and incorporate DNA construct between the duplicated regions.

All these modifications can be performed by classical mutagenesis techniques (Botstein and Shortle, Strategies and applications of in vitro mutagenesis. Science. 1985 Sep. 20; 229(4719):1193-201., among others).

Aiming to provide strains that show improved performance in the production of enzyme cocktails, a new strains of *Trichoderma* was developed that comprises specific genetic modifications: overexpression of transcription factor Xyr1, as defined in SEQ ID No. 1; disruption of the ACE1 gene according to SEQ ID No. 2; disruption of the SLP1 gene according to SEQ ID No. 3; and expression of the Cel3a gene from *Rasamsonia emersoni* as per SEQ ID No. 4.

The *Trichoderma* strain according to the present invention may be any *Trichoderma* strain, such as a wild-type *Trichoderma* strain or a mutant thereof.

The new strain according to the present invention can be produced, without any limitation, by classical mutagenesis techniques, well known by the person skilled in the art.

In particular embodiment, the strain is *Trichoderma reesei* modified to include at least the four specific gene modifications according to the present invention.

In an even more particular embodiment, the strain is *Trichoderma reesei* RutC30 (Koike H. et al. 2013. Comparative genomics analysis of *Trichoderma reesei* strains. Ind. Biotech. 9(6):352-367). This strain has its cellulolytic potential increased due to the mutation of the cre1 gene (causing lesser effect of the catabolite repression of glucose by the cells, during the expression of enzymes) and to the increase in the amount of endoplasmic reticulum (promoting an increase in the rates of O-glycosylation of proteins).

*Trichoderma reesei* Xyr1 transcription factor is required for the expression and secretion of lignocellulolytic enzymes (cellulases and hemicellulases), more specifically of xylanases, and the constitutive expression of this gene increases the enzymatic activity of the cocktail secreted by the fungus. In a particular embodiment of the present invention, the xyr1 gene was placed under expression control of the pdc1 gene in the RUT-C30 strain.

The ace1 gene has been identified as a transcription factor that represses the production of (hemi)cellulases in *Trichoderma reesei*. Deletion of this gene increases enzymatic production.

On the other hand, the absence of proteases is a determining factor for the stability of enzyme preparations. For this reason, the removal of proteases coding genes from genomes of (hemi)cellulase-producing fungi has been studied. The slp1 gene from *Trichoderma reesei* is a protease coding and presents gains in the global production of enzymes. The individual effect of the slp1 gene deletion on fungal productivity has not been reported in the state of the art.

In turn, the expression of the cel3a gene (beta-glucosidase) from *Rasamsonia emersonii* represents a significant impact on the activity of the beta-glucosidase enzyme, which is essential for the efficient degradation of lignocellulosic materials. The low beta-glucosidase activity in the enzyme cocktail secreted by *Trichoderma reesei* has been frequently reported in the prior art and remains a technical challenge to be overcome.

Surprisingly, the present invention provides a new strain of *Trichoderma*, in which the selection of specific gene modifications, allows to considerably improve the beta-glucosidase activity.

In another embodiment, the present invention additionally contemplates one or more of the following gene modifications: disruption of the PEP1 gene as per SEQ ID No. 5; expression of the SucA gene from *Aspergillus niger* according to SEQ ID No. 6.

The disruption of the PEP1 gene, which encodes an aspartic protease and its inactivation, is related to an increase in the secretion of lignocellulolytic enzymes and heterologous enzymes in *Trichoderma reesei*.

Regarding the expression of the SucA gene of *Aspergillus niger*, this gene encodes an invertase, an enzyme that catalyzes the hydrolysis of sucrose into fructose plus glucose, allowing the use of sugarcane molasses as a carbon source for the production of enzymes.

Within the scope of the present invention, the term "modified" means introduction, substitution, or removal of one or more (several) nucleotides in a gene or a control sequence required for its transcription or translation, or gene disruption, gene deletion, gene overexpression in a selected *Trichoderma* strain, by any techniques known to the skilled person.

*Trichoderma* strains according to the present invention can be cultivated in a nutrient medium for the production of the polypeptide of interest by using methods known in the art. For example, in a particular embodiment, without any limitation, the culture medium may consist of yeast, e.g. not autolyzed whole yeast (*Saccharomyces cerevisiae*), at least one carbon source such as sugarcane molasses and ammonium sulfate.

The following examples, without any limitation, describe some of the particular embodiments of the present invention and aim at showing its advantages.

Example 1. Comparative Results of the Effect on Enzyme Production and Beta-Glucosidase Activity Examples The *Trichoderma reesei* Rut C30 strain was modified by classical mutagenesis techniques known to the person skilled in the art for the deletion of the ace1 gene in a RUT-C30 strain. The deletion was performed simultaneously with the constitutive expression of the xyr1 gene containing the V821F mutation, generating the fungus called CTBE_R2 (comparative). Both modifications were carried out to increase the enzyme production of the fungus.

Following the present invention, the deletion of the protease slp1 in the CTBE_R2 strain was performed at the same time as the insertion of the beta-glucosidase Cel3a from *Rasamsonia emersonii*, generating the fungus called CTBE_R4 (invention).

Both strains were independently cultivated in bioreactors containing molasses, yeast extract, and ammonium sulfate, presenting the results shown in FIGS. 1 and 2.

As can be seen in FIG. 1, the enzymatic production of the fungus CTBE_R4 (of the invention) is similar to that of the fungus CTBE_R2 (comparative), indicating that the made modifications do not change the productivity of the fungus.

However, as shown in FIG. 2, the enzyme cocktail produced by the fungus CTBE_R4 (of the invention) showed a beta-glucosidase activity 42 times greater than that produced by the fungus CTBE_R2 (comparative).

The person skilled in the art will readily know how to evaluate, through the teachings contained in the text and the examples presented, advantages of the invention and propose variations and equivalent alternative embodiments, without departing from the scope of the invention, as defined in the claims herein.

The invention claimed is:

1. A modified *Trichoderma* fungus comprising:
   (1) deletion of an ACE1 gene encoding the polypeptide consisting of SEQ ID NO:2, and simultaneous insertion of an xyr1V821F gene at the ACE1 locus, resulting in disruption by deletion of the ACE1 gene and constitutive expression of transcription factor Xyr1 containing the V821F mutation; and
   (2) deletion of an SLP1 gene encoding the polypeptide consisting of SEQ ID NO:3, and simultaneous insertion of a Cel3a gene from *Rasamsonia emersonii* at the SLP1 locus, resulting in disruption by deletion of the SLP1 gene and expression of beta-glucosidase Cel3a as set forth in SEQ ID NO:4 4;
   wherein:
   SEQ ID NO: 2 is the sequence of the protein expressed by the ACE1 gene prior to disruption;
   SEQ ID NO: 3 is the sequence of the protein expressed by the SLP1 gene prior to disruption; and
   the modified strain of *Trichoderma* fungus has at least about 42 times greater activity of beta-glucosidase enzyme compared to unmodified *Trichoderma* fungus.

2. The strain according to claim 1 characterized in that the genetically modified fungus is *Trichoderma reesei*.

3. The strain according to claim 2 characterized in that the genetically modified fungus is *Trichoderma reesei* of the Rut C30 strain.

4. The strain according to claim 1 characterized in that it further comprises a disruption by deletion of a PEP1 gene encoding the polypeptide as set forth in SEQ ID No. 5, wherein SEQ ID No. 5 is the protein expressed by the sequence of the PEP1 gene prior to disruption.

5. The strain according to claim 1 characterized in that it further comprises expression of a SucA gene of *Aspergillus niger* encoding the polypeptide as set forth in SEQ ID No. 6.

6. The strain according to claim 5 characterized in that the SucA gene from *Aspergillus niger* is inserted at the PEP1 locus, resulting in deletion of the PEP1 gene and expression of SucA.

* * * * *